No. 782,860. PATENTED FEB. 21, 1905.
J. LEVER.
STRAINER FOR WASH OR OTHER BASINS.
APPLICATION FILED MAR. 18, 1904.
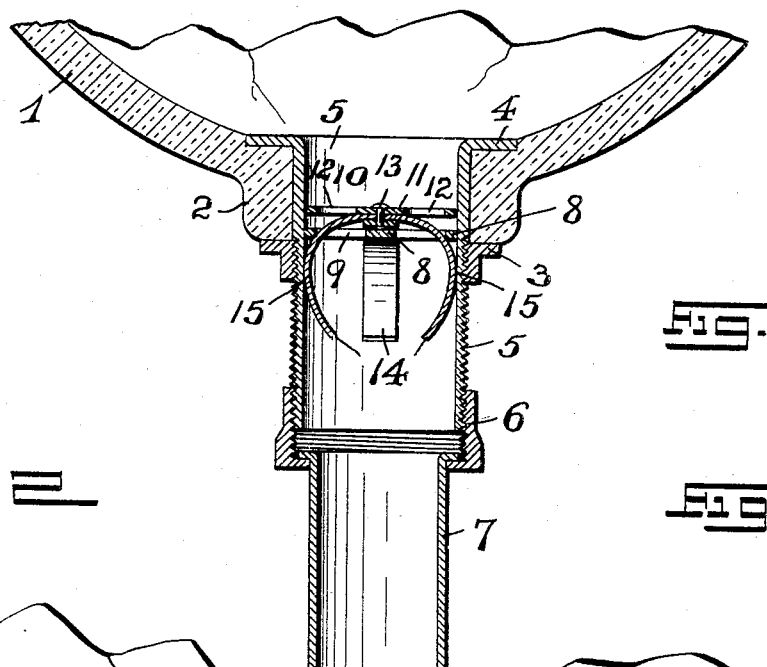
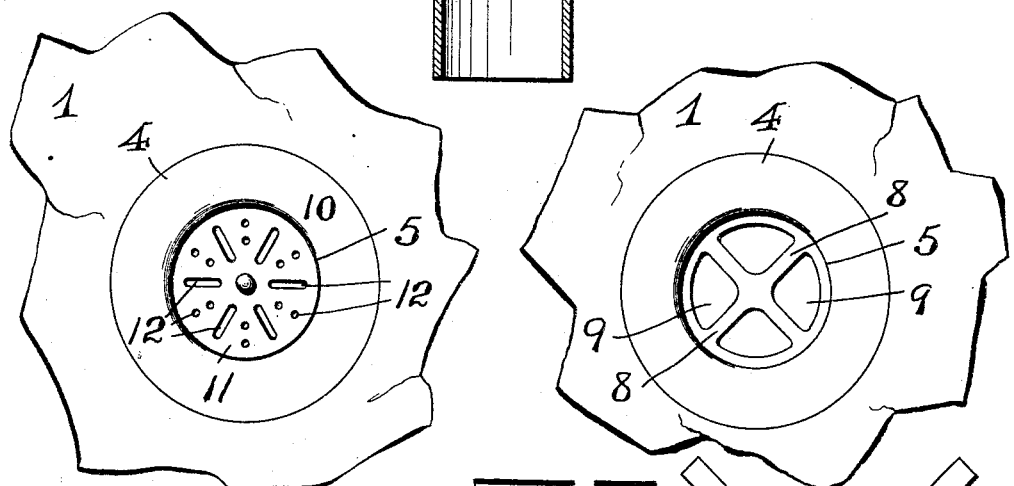
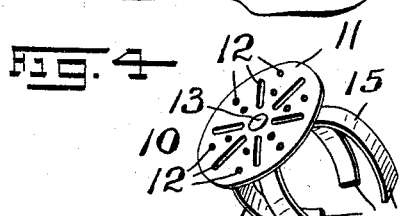
WITNESSES:
Geo. D. Richards
F. A. Feldkamp
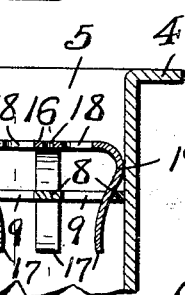
INVENTOR:
John Lever,
BY
Fred'k C. Fraentzel
ATTORNEY No. 782,860.

Patented February 21, 1905.

UNITED STATES PATENT OFFICE.

JOHN LEVER, OF NEWARK, NEW JERSEY.

STRAINER FOR WASH OR OTHER BASINS.

SPECIFICATION forming part of Letters Patent No. 782,860, dated February 21, 1905.

Application filed March 18, 1904. Serial No. 198,779

*To all whom it may concern:*

Be it known that I, JOHN LEVER, a citizen of the United States, residing at Newark, in the county of Essex and State of New Jersey, have invented certain new and useful Improvements in Strainers for Wash or other Basins; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference to improvements in strainers for washbasins, wash-trays, sinks, bath-tubs, urinal-basins, and the like; and the invention has for its principal object to provide a simple, neat, and cheap strainer adapted to be detachably arranged in the outlet or spud of such basins, trays, tubs, and the like with a view of providing a sanitary means for readily keeping foreign matter from collecting upon the usual cross rods or bars arranged in the outlet pipe or spud and preventing large objects from passing into and collecting in the waste-pipe and form an objectionable obstruction.

A further object of this invention is to provide a strainer of the character hereinafter stated and one which is removably placed in the outlet pipe or spud to enable its being often cleansed and when arranged in its detachable relation in the outlet or spud still not interfering with the use of the usual stopper which is employed with the basin, tub, or the like.

Other objects of this invention not at this time especially mentioned will be fully understood from the following detailed description of my invention.

My invention consists primarily in the novel strainer for waste-pipes or spuds of washbasins, wash-trays, sinks, bath-tubs, urinal-basins, and the like hereinafter more particularly set forth; and, furthermore, this invention consists in the various arrangements and combinations of parts, as well as in the details of the construction thereof, all of which will be hereinafter more fully described and then finally embodied in the clauses of the claim which are appended to and form an essential part of the said specification.

The invention is clearly illustrated in the accompanying drawings, in which—

Figure 1 is a sectional representation of a portion of a washbasin and its outlet or spud with the removable or detachable strainer in position in the said outlet. Fig. 2 is a plan view of the said parts represented in said Fig. 1 with the stopper removed; and Fig. 3 is a similar view with the strainer removed, illustrating the general arrangement and construction of the parts of the usual form of outlet or spud for basins. Fig. 4 is a perspective view of the strainer. Fig. 5 is a sectional representation of an outlet or spud for basins provided with a removable strainer of a slightly-modified construction, and Fig. 6 represents in plan a blank of sheet metal from which the strainer indicated in said Fig. 5 is made.

Similar characters of reference are employed in the above-described views to indicate corresponding parts.

Referring now to the said drawings, the reference character 1 indicates a portion of a washbasin provided with the usual outlet 2, in which is secured and arranged, by means of a nut 3 and a flanged part 4, the usual form of outlet pipe or spud 5, which is connected, by means of a union 6, to the waste-pipe 7. Within this outlet pipe or spud 5 are arranged in any suitable manner, usually by being soldered in place, the usual cross-bars 8, as clearly illustrated in Fig. 3 of the drawings. As will be noticed from an inspection of the said Fig. 3, the arrangement of these bars 8 is such that very large open spaces 9 are formed, which provides no protection against large objects—such as matches, hair-pins, and often buttons—from entering the outlet-pipe 5 or of hair and other foreign matter collecting upon the said cross-bars 8, and thereby providing an unsanitary and unsightly condition of the outlet, which at times is difficult to clean and sometimes requires the plumber to remove such obstruction and unclean condition of the pipe at the outlet of the basin. That this unclean and non-sanitary condition may be readily overcome I have provided the outlet or spud of the basin, tray, or tub with a removable strainer, as 10, which is easily forced into and held preferably by frictional contact with the interior cylindrical surface of the outlet pipe or spud 5, as will be presently described, and which can be easily removed from day to day, if necessary, so as to be cleaned by the most unskilled person by the simple insertion of the prong of a hair-pin or the blade of a knife into one of the perforations of the strainer to lift it from its position within the said pipe or spud.

In practice I prefer to make this strainer 10 of any suitable sheet metal, as brass or the like, the same comprising a disk-shaped body 11 of approximately the diameter of the internal diameter of the said pipe or spud 5, the body 11 being provided with any suitable arrangement of holes or perforations 12, some of which may be of a long and narrow configuration, as shown in the drawings; but this is not an absolute necessity, and the plate or body 11 may be provided with any desired arrangement of holes or perforations. Suitably secured against the under surface of the said body or plate 12, by means of solder or any other fastening means, is an arrangement of spring-arms 14, which are provided with curved portions 15, adapted when the said strainer is inserted in position in the outlet pipe or stud 5 to be passed through the open spaces 9 with the curved portions 15 of the spring-arms 14 arranged in slidable holding engagement with the inner surface portions of the pipe or spud 5, as clearly illustrated in Fig. 1 of the drawings.

Thus it will be seen that the strainer is easily removed from within the outlet pipe or spud 5 and may be quickly replaced in its operative position therein, and it is held at the proper depth in the said pipe or spud so that the strainer will not interfere with the use of the stopper, which can be placed in the mouth of the said outlet pipe or spud 5 in the usual and well-known manner.

In Figs. 5 and 6 I have represented a slightly-modified construction of strainer in which the body or plate and the spring-arms are all made from a single piece of sheet metal, the said spring-arms being integrally connected with the circular edge of the main body or plate. In these figures the said plate or body is indicated by the reference character 16 and the spring-arms by the numerals 17. The said body or plate is formed with the holes or perforations 18, and the said arms are bent into shape represented in said Fig. 5, being provided with the rounded parts 19, which serve as holding portions for detachably arranging this form of strainer in the said outlet pipe or spud 5.

I am aware that some changes may be made in the arrangements and combinations of the parts without departing from the scope of this invention. Hence I do not limit my invention to the exact arrangements and combinations of the parts as herein described and as illustrated in the accompanying drawings, nor do I confine myself to the exact details of the construction of the said parts.

Having thus described my invention, what I claim is—

1. The combination, with the outlet pipe or spud of a wash or other basin provided with cross-bars having openings between them, of a removable strainer consisting, essentially, of a main disk substantially of the same diameter as the inner diameter of said pipe or spud, said disk being provided with perforations, and outwardly-curved and diametrically-opposed spring-arms connected with the said disk, said spring-arms being passed through the openings formed by the cross-bars of the outlet pipe or spud, and having portions in slidable and frictional holding engagement with the inner surface of said outlet pipe or spud below said cross-bars, for adjustably arranging the said strainer-disk within the said pipe or spud, either, directly upon said cross-bars or at other points above the said cross-bars, substantially as and for the purposes set forth.

2. The combination, with the outlet pipe or spud of a wash or other basin provided with cross-bars having openings between them, of a removable strainer consisting, essentially, of a main disk substantially of the same diameter as the inner diameter of said pipe or spud, said disk being provided with perforations, a centrally-arranged fastening-pin extending downwardly from the said disk, and diametrically-opposed and downwardly-extending spring-arms secured by means of said pin at the center of the lower surface of said disk, said arms being passed through the openings formed by the cross-bars of the outlet pipe or spud, and curving outwardly and having their curved portions in slidable and frictional holding engagement with the inner surface of said outlet pipe or spud below said cross-bars, for adjustably arranging the said strainer-disk within the said pipe or spud, either, directly upon said cross-bars or at other points above the said cross-bars, substantially as and for the purposes set forth.

In testimony that I claim the invention set forth above I have hereunto set my hand this 15th day of March, 1904.

JOHN LEVER.

Witnesses:
FREDK. C. FRAENTZEL,
HAROLD LEVER.